(12) United States Patent
Okuda et al.

(10) Patent No.: US 10,605,466 B2
(45) Date of Patent: Mar. 31, 2020

(54) HEAT PUMP

(71) Applicant: Yanmar Co., Ltd., Osaka-shi, Osaka (JP)

(72) Inventors: Norihiro Okuda, Osaka (JP); Hirohiko Nobuhara, Osaka (JP)

(73) Assignee: YANMAR CO., LTD., Osaka (JP)

( * ) Notice: Subject to any disclaimer, the term of this patent is extended or adjusted under 35 U.S.C. 154(b) by 0 days.

(21) Appl. No.: 15/528,142

(22) PCT Filed: Nov. 18, 2015

(86) PCT No.: PCT/JP2015/082454
§ 371 (c)(1),
(2) Date: May 19, 2017

(87) PCT Pub. No.: WO2016/080461
PCT Pub. Date: May 26, 2016

(65) Prior Publication Data
US 2017/0328582 A1 Nov. 16, 2017

(30) Foreign Application Priority Data
Nov. 21, 2014 (JP) ................. 2014-237141

(51) Int. Cl.
F24F 1/16 (2011.01)
F25B 43/00 (2006.01)
(Continued)

(52) U.S. Cl.
CPC ............ F24F 1/16 (2013.01); F02M 21/023 (2013.01); F24F 1/10 (2013.01); F24F 1/46 (2013.01);
(Continued)

(58) Field of Classification Search
CPC ....... F24F 1/16; F24F 1/10; F24F 1/46; F25B 43/003; F25B 2500/04; F25B 2400/0413
See application file for complete search history.

(56) References Cited

U.S. PATENT DOCUMENTS 4,339,332 A * 7/1982 Jasperson ........... A47L 15/4436
210/167.11
4,481,110 A * 11/1984 Shannon ............... B01F 1/0033
210/199
(Continued)

FOREIGN PATENT DOCUMENTS

| CN | 2304851 Y | 1/1999 |
| CN | 2443301 Y | 8/2001 |

(Continued)

OTHER PUBLICATIONS

International Search Report (PCT/ISA/210) issued in PCT Application No. PCT/JP2015/082454 dated Feb. 9, 2016 with English-language translation (five (5) pages).

(Continued)

Primary Examiner — Nelson J Nieves
(74) Attorney, Agent, or Firm — Norton Rose Fulbright US LLP

(57) ABSTRACT

A gas-side stop valve on the gas refrigerant side and a liquid-side stop valve on the liquid refrigerant side are provided in a package of an outdoor unit. A gas-side filter on the gas refrigerant side is mounted on the indoor unit side relative to the gas-side stop valve and inside the package of the outdoor unit. A liquid-side filter 9 on the liquid refrigerant side is mounted on the indoor unit side relative to the liquid-side stop valve and inside the package of the outdoor unit. As a result, it is not necessary to ensure a place for mounting the gas-side filter and the liquid-side filter at the time of installation on site and the workability can be improved.

17 Claims, 5 Drawing Sheets

(51) Int. Cl.

| | |
|---|---|
| *F24F 1/46* | (2011.01) |
| *F25B 13/00* | (2006.01) |
| *F02M 21/02* | (2006.01) |
| *F24F 1/10* | (2011.01) |
| *B01D 33/00* | (2006.01) |
| *B01D 33/66* | (2006.01) |
| *F04B 39/02* | (2006.01) |

(52) U.S. Cl.
CPC ............ *F25B 13/00* (2013.01); *F25B 43/003* (2013.01); *B01D 33/0087* (2013.01); *B01D 33/666* (2013.01); *F04B 39/0207* (2013.01); *F25B 2500/04* (2013.01); *F25B 2700/19* (2013.01)

(56) References Cited

U.S. PATENT DOCUMENTS

| | | | | |
|---|---|---|---|---|
| 4,528,826 A | * | 7/1985 | Avery, Jr. ............. | F25B 43/003 62/292 |
| 4,554,792 A | * | 11/1985 | Margulefsky ........... | F25B 45/00 62/149 |
| 5,339,646 A | * | 8/1994 | Verlinden ............... | F25B 45/00 62/292 |
| 5,575,833 A | * | 11/1996 | Griffin ................... | B01D 53/04 210/167.31 |
| 5,617,731 A | * | 4/1997 | Scaringe ................ | F25B 45/00 62/149 |
| 7,219,503 B2 | | 5/2007 | Albertson | |
| 2006/0179864 A1 | | 8/2006 | Choi et al. | |
| 2006/0242991 A1 | * | 11/2006 | Albertson ............... | F25B 43/02 62/470 |
| 2007/0277536 A1 | * | 12/2007 | Judge ...................... | F25B 40/02 62/85 |
| 2009/0206018 A1 | * | 8/2009 | Kaneko ............... | B01D 29/114 210/167.32 |
| 2013/0112282 A1 | * | 5/2013 | Uto .................... | B60H 1/00535 137/15.01 |
| 2015/0192216 A1 | * | 7/2015 | Mesner .................. | F25B 41/06 137/269 |

FOREIGN PATENT DOCUMENTS

| | | |
|---|---|---|
| CN | 2797948 Y | 7/2006 |
| CN | 202955909 U | 5/2013 |
| CN | 203642382 U | 6/2014 |
| JP | 51-50250 U1 | 4/1976 |
| JP | 58-110774 U | 7/1983 |
| JP | 62-84270 A | 4/1987 |
| JP | 9-112966 A | 5/1997 |
| JP | 11-230581 A | 8/1999 |
| JP | 2001-255045 A | 9/2001 |
| JP | 2001255045 A * | 9/2001 |
| JP | 2007-127325 A | 5/2007 |
| JP | 2008-32247 A | 2/2008 |
| JP | 2009-168421 A | 7/2009 |
| JP | 2012-017974 A | 1/2012 |
| JP | 52-48152 U | 7/2013 |
| JP | 5303106 B2 | 10/2013 |
| JP | 2012-184866 | 9/2017 |
| KR | 1998025717 A | 7/1998 |
| KR | 10-0193183 B1 | 6/1999 |
| KR | 101206278 B1 | 11/2012 |
| KR | 1020130100424 A | 9/2013 |

OTHER PUBLICATIONS

Japanese-language Written Opinion (PCT/ISA/237) issued in PCT Application No. PCT/JP2015/082454 dated Feb. 9, 2016 (four (4) pages).
Examination report No. 1 dated Jun. 29, 2018 in corresponding AU Application 2015350987 cites the patent document above.
European Search Report dated Aug. 9, 2018 issued in corresponding EP Application 15860552.7cites the patent document above.
International Preliminary Report on Patentability (PCT/IB/338 & PCT/IB/373) issued in PCT Application No. PCT/JP2015/082454 dated Jun. 1, 2017, including English translation of C2 (Japanese-language Written Opinion (PCT/ISA/237)) previously filed on May 19, 2017 (seven (7) pages).
Japanese-language Office Action issued in counterpart Japanese Application No. 2014-237141 dated Dec. 19, 2017 with English translation (Six (6) pages).
Korean Office Action dated Jan. 18, 2019 in corresponding KR Application 10-2017-7013619 cites the patent documents above.
Chinese Office Action issued on Apr. 24, 2019 in corresponding CN Application 201580055123.8.

* cited by examiner

HEAT PUMP

TECHNICAL FIELD

The present invention relates to a heat pump and, for example, to an engine-driven heat pump using a gas engine etc. and an electrically-driven heat pump.

BACKGROUND ART

Conventional air conditioning apparatuses include an apparatus described in Japanese Laid-Open Patent Publication No. 11-230581 (Patent Document 1). This air conditioning apparatus has a stop valve for temporarily sealing an outdoor unit from the outside when the outdoor unit is connected via piping to an indoor unit. This air conditioning apparatus also has an electromagnetic valve unit having a built-in strainer or filter on the indoor unit side relative to the stop valve. Such an electromagnetic valve unit is provided outside a package (i.e., a case made up of outer plates) of the outdoor unit.

PATENT DOCUMENT

Patent Document 1: JP 11-230581 A

SUMMARY OF THE INVENTION

Problem to be Solved by the Invention

However, since the electromagnetic valve unit is provided outside the package of the outdoor unit and a place for mounting the electromagnetic valve unit (having a built-in strainer or filter) must therefore be ensured at the time of installation on site, the conventional air conditioning apparatus described above apparatus has a problem of poor workability.

Therefore, a problem to be solved by the present invention is to provide a heat pump having no need for ensuring a place for mounting a gas (gas refrigerant) side filter and a liquid (liquid refrigerant) side filter at the time of installation on site so that the workability can be improved.

Means for Solving Problem

To solve the problem, a heat pump of the present invention is a heat pump having an outdoor unit with a compressor and an outdoor heat exchanger housed in a package and an indoor unit with an indoor heat exchanger such that the outdoor unit and the indoor unit are connected through a gas refrigerant pipe and a liquid refrigerant pipe, wherein a gas-side stop valve on the gas refrigerant side and a liquid-side stop valve on the liquid refrigerant side are provided in the package of the outdoor unit, and a gas-side filter on the gas refrigerant side is mounted on the indoor unit side relative to the gas-side stop valve and inside the package of the outdoor unit while a liquid-side filter on the liquid refrigerant side is mounted on the indoor unit side relative to the liquid-side stop valve and inside the package of the outdoor unit.

Effect of the Invention

According to the heat pump of the present invention, it is not necessary to ensure the place for mounting the gas-side filter and the liquid-side filter at the time of installation on site so that the workability can be improved.

EMBODIMENTS FOR CARRYING OUT THE INVENTION

Figure 1:
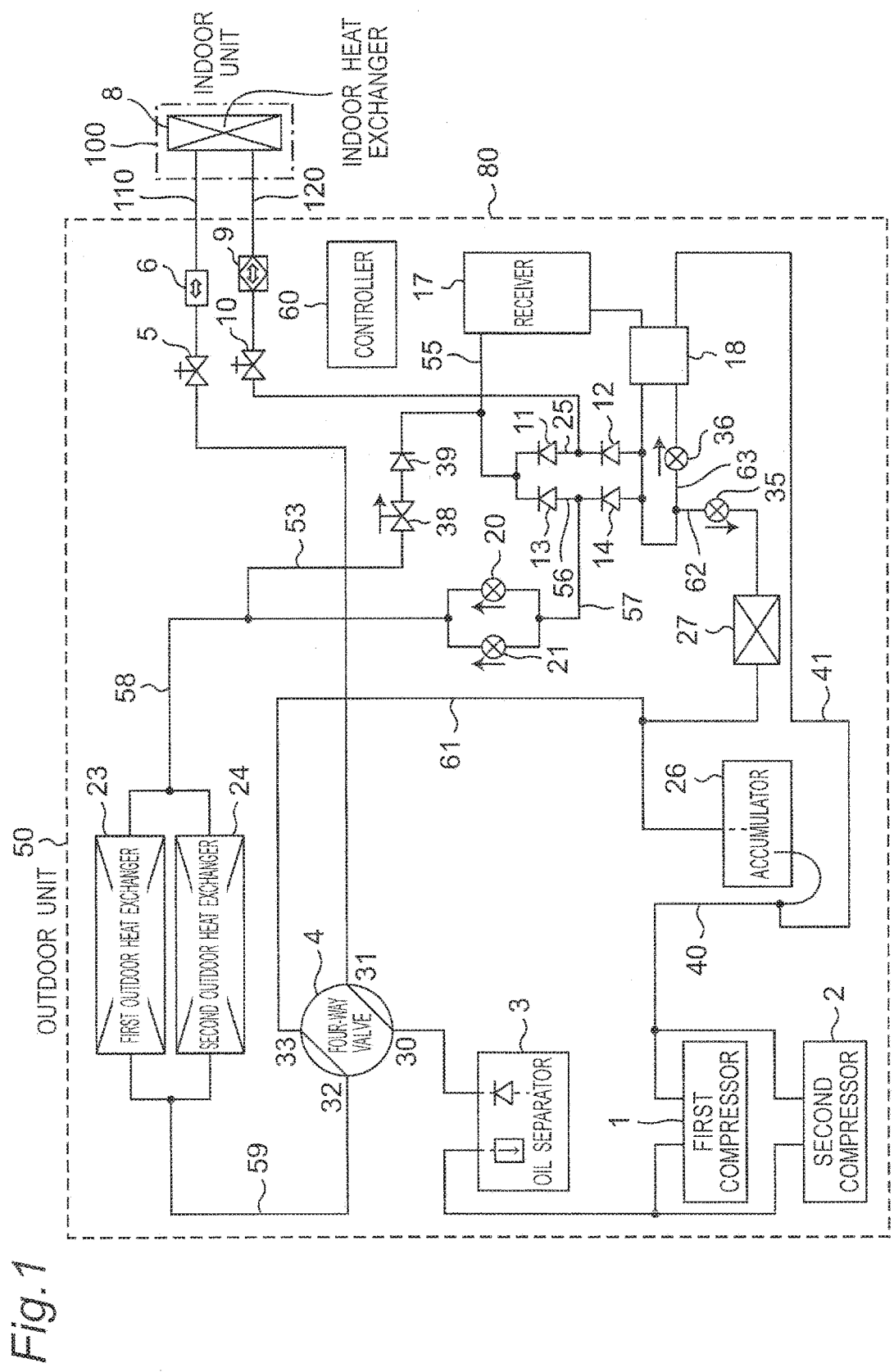
FIG. 1 is a simplified refrigerant circuit diagram of a gas-engine-driven heat pump according to an embodiment of the present invention.

A heat pump according to an aspect of the present invention is a heat pump having an outdoor unit with a compressor and an outdoor heat exchanger housed in a package and an indoor unit with an indoor heat exchanger such that the outdoor unit and the indoor unit are connected through a gas refrigerant pipe and a liquid refrigerant pipe, wherein a gas-side stop valve on the gas refrigerant side and a liquid-side stop valve on the liquid refrigerant side are provided in the package of the outdoor unit, and a gas-side filter on the gas refrigerant side is mounted on the indoor unit side relative to the gas-side stop valve and inside the package of the outdoor unit while a liquid-side filter on the liquid refrigerant side is mounted on the indoor unit side relative to the liquid-side stop valve and inside the package of the outdoor unit.

It is noted that the package is defined as a case (shield) defining a chamber housing the compressor with respect to the outside. Therefore, in the present invention, the gas-side stop valve, the liquid-side stop valve, the gas-side filter, and the liquid-side filter are disposed in a chamber inside the case housing the compressor.

According to an embodiment of the present invention, since the gas-side filter on the gas refrigerant side and the liquid-side filter on the liquid refrigerant side conventionally mounted outside the package of the outdoor unit in installation on site are provided inside the package of the outdoor unit, it is not necessary to ensure a place for mounting the gas-side filter and the liquid-side filter outside the outdoor unit at the time of installation on site. Therefore, the workability is improved.

The gas-side stop valve and the gas-side filter may be arranged such that the gas-side stop valve and the gas-side filter each extend in an up-down direction, and at least a portion of the gas-side stop valve may be present in a height range overlapping with a height range in which the gas-side filter is present.

It is noted that in this description, "extending in an up-down direction" means extending in an extension direction having a component in the height direction larger than a component in the horizontal direction when the outdoor unit is placed on the horizontal plane in a posture in a usage state. Hereinafter, when a wording (expression) related to height such as a horizontal direction, a vertical direction, and a height direction is used in this description, the wording refers to a direction etc. in the state of the outdoor unit placed on the horizontal plane.

According to such a configuration, since at least a portion of the gas-side stop valve is present in the height range overlapping with the height range in which the gas-side filter is present, the height direction can effectively be utilized to house the gas-side stop valve and the gas-side filter in the package. Therefore, the gas-side filter can be built into the package and an increase in installation area of the package can be suppressed.

A gas refrigerant pipe connecting member may be provided at a position at which the gas refrigerant pipe is connectable on the indoor unit side relative to the gas-side filter from the outside of the package; the gas-side stop valve may be provided in a portion closer than the gas-side filter to the gas refrigerant pipe connecting member; and the gas-side stop valve and the gas refrigerant connecting member may each be provided with a pressure extraction port serving as a pressure detecting part.

According to such a configuration, since the gas-side stop valve and the gas refrigerant connecting member are each provided with a pressure extraction port, pressure gauges can be disposed on the upstream side and the downstream side of a gas refrigerant flow in the gas-side filter. Therefore, since the pressure of gas can be measured on the upstream side and the downstream side of the gas-side filter, the workability is improved at the time of confirmation of clogging of the gas-side filter.

The liquid-side stop valve may be disposed such that the liquid-side stop valve extends in an up-down direction, and the liquid-side filter may be disposed such that the liquid-side filter extends in a horizontal direction.

According to such a configuration, since the extending direction of the liquid-side stop valve is greatly different from the extending direction of the liquid-side filter, the liquid-side stop valve and the liquid-side filter can be disposed substantially independently of each other. Therefore, since the liquid-side stop valve and the liquid-side filter can be disposed in narrow spaces different from each other, the liquid-side stop valve and the liquid-side filter can each be disposed by effectively utilizing a narrow space (gap).

A liquid refrigerant connecting member may be provided at a position at which the liquid refrigerant pipe is connectable on the indoor unit side relative to the liquid-side filter from the outside of the package, and the liquid-side stop valve and the liquid refrigerant connecting member may each be provided with a pressure extraction port serving as a pressure detecting part.

According to such a configuration, since the liquid-side stop valve and the liquid refrigerant connecting member are each provided with a pressure extraction port, pressure gauges can be disposed on the upstream side and the downstream side of a liquid refrigerant flow in the liquid-side filter. Therefore, since the pressure of liquid refrigerant can be measured on the upstream side and the downstream side of the liquid-side filter, the workability is improved at the time of confirmation of clogging of the liquid-side filter. Additionally, the differential pressure detection of the gas-side filter and the differential pressure detection of the liquid-side filter can be performed by simply removing an outer plate of the same package.

The present invention will now be described in detail with a shown embodiment.

FIG. 1 is a simplified refrigerant circuit diagram of a gas-engine-driven heat pump according to an embodiment of the present invention.

As shown in FIG. 1, this heat pump includes an outdoor unit 50, an indoor unit 100, a gas refrigerant pipe 110, and a liquid refrigerant pipe 120. This heat pump also includes a controller 60 for the outdoor unit 50. A dotted line denoted by reference numeral 60 of FIG. 1 indicates a package of the outdoor unit 50. As shown in FIG. 1, the gas refrigerant pipe 110 and the liquid refrigerant pipe 120 each connect the outdoor unit 50 and the indoor unit 100.

The outdoor unit 50 includes a first compressor 1, a second compressor 2, an oil separator 3, a four-way valve 4, a gas-side stop valve 5, a gas-side filter 6, a liquid-side filter 9, a liquid-side stop valve 10, a first check valve 11, a second check valve 12, a third check valve 13, a fourth check valve 14, a receiver 17, and a subcooling heat exchanger 18. The outdoor unit 50 also includes a first electronic expansion valve 20, a second electronic expansion valve 21, a first outdoor heat exchanger 23, a second outdoor heat exchanger 24, an accumulator 26, a sub-evaporator (refrigerant auxiliary evaporator) 27, a third electronic expansion valve 35, a fourth electronic expansion valve 36, an electromagnetic valve 38, and a fifth check valve 39. On the other hand, the indoor unit 100 has an indoor heat exchanger 8.

The controller 60 outputs control signals to the first compressor 1, the second compressor 2, the four-way valve 4, the first electronic expansion valve 20, the second electronic expansion valve 21 the third electronic expansion valve 35 the fourth electronic expansion valve 36, and the electromagnetic valve 38 to control these devices. Although not shown, the controller 60 is electrically connected through a signal line to each of these devices.

As shown in FIG. 1, the first compressor 1, the second compressor 2, the gas-side stop valve 5, the liquid-side stop valve 10, the gas-side filter 6, and the liquid-side filter 9 are provided in the package 80 of the outdoor unit 50. The first compressor 1, the second compressor 2, the gas-side stop valve 5, the liquid-side stop valve 10, the gas-side filter 6, and the liquid-side filter 9 are arranged in the same chamber defined by the package 80.

As shown in FIG. 1, the first compressor 1 and the second compressor 2 are arranged in parallel, and lines on the discharge side of the first and second compressors 1, 2 are connected to a refrigerant inlet of the oil separator 3. The refrigerant outflow side of the oil separator 3 is connected to a first port 30 of the four-way valve 4. A second port 31 of the four-way valve 4 is connected via the gas-side stop valve 5 and gas-side filter 6 to a port on the gas side of the indoor heat exchanger 8. The gas-side filter 6 is disposed on the indoor unit 100 side relative to the gas-side stop valve 5 and inside the package 80 of the outdoor unit 50.

A port on the liquid side of the indoor heat exchanger 8 is connected through the liquid-side filter 9 and the liquid-side stop valve 10 to a line 25 connecting a port on the refrigerant outflow side of the first check valve 11 and a port on the refrigerant inflow side of the second check valve 12. The liquid-side filter 9 is disposed on the indoor unit 100 side relative to the liquid-side stop valve 10 and inside the package 80 of the outdoor unit 50. A port on the refrigerant outflow side of the first check valve 11 is connected through a line 55 to a port on the refrigerant inflow side of the receiver 17. A port on the refrigerant outflow side of the receiver 17 is connected through the subcooling heat exchanger 18 to respective ports on the refrigerant inflow side of the second and fourth check valves 12, 14.

As shown in FIG. 1, a port on the refrigerant outflow side of the fourth check valve 14 and a port on the refrigerant inflow side of the third check valve 13 are connected by a line 56. The first and second electronic expansion valves 20, 21 are connected in parallel to a line 57 branched from the line 56. The first and second outdoor heat exchangers 23, 24 are connected in parallel to a line 58 led out from a side of the first and second electronic expansion valves 20, 21 different from the side connected to the check valves 13, 14. The first and second electronic expansion valves 20, 21 are connected in series to the first and second outdoor heat exchangers 23, 24.

A line 59 led out from a side of the first and second outdoor heat exchangers 23, 24 different from the side connected to the electronic expansion valves 20, 21 is connected to a third port 32 of the four-way valve 4. As shown in FIG. 1, a fourth port 33 of the four-way valve 4 is connected to the accumulator 26. The accumulator 26 is connected to the intake side of the compressors 1, 2.

The port on the refrigerant inflow side of the fourth check valve 14 is connected via the third electronic expansion valve 35 to the sub-evaporator 27. A side of the sub-evaporator different from the side connected to the fourth check valve 14 is connected to a line 61 connecting the fourth port 33 of the four-way valve and the accumulator 26.

A new line 63 is branched from the line 62 connecting the port on the refrigerant inflow side of the fourth check valve 14 and the third electronic expansion valve 35. The branched line 63 is connected through the fourth electronic expansion valve 36 to the subcooling heat exchanger 18. As shown in FIG. 1, the subcooling heat exchanger 18 is directly connected through a line 41 to a line 40 connecting the accumulator 26 and the compressors 1, 2. The refrigerant passing through the subcooling heat exchanger 18 passes through the subcooling heat exchanger 18 and then flows through the line 41 toward the compressors 1, 2.

As shown in FIG. 1, the line 58 connecting the outdoor heat exchangers 23, 24 and the electronic expansion valves 20, 21 is branched, and a line 53 branched from the line 58 is connected to the line 55 connecting the first and third check valves 11, 13 to the receiver 17. The electromagnetic valve 38 and the fifth check valve 39 are arranged on the path of the branched line 53. As shown in FIG. 1, the electromagnetic valve 38 is located closer than the fifth check valve 39 to the outdoor heat exchangers 23, 24 on the line 53. The controller 60 controls the electromagnetic valve 38 to a fully-opened or fully-closed state.

In the configuration described above, this heat pump performs cooling and heating operations as follows.

First, in the heating operation, the controller 60 controls the four-way valve 4 to connect the first port 30 and the second port 31 of the four-way valve 4 and connect the third port 32 and the fourth port 33.

In the heating operation, the high pressure refrigerant gas discharged from the compressors 1 and 2 first flows into the oil separator 3. The oil separator 3 separates a lubricating oil of the compressors 1, 2 from the refrigerant gas. Although not described in detail, the lubricating oil separated from the refrigerant gas by the oil separator 3 is returned to the compressors 1, 2 through a line not shown.

After passing through the oil separator 3, the refrigerant gas passes through the four-way valve 4, the gas-side stop valve 5, and the gas-side filter 6 in this order and flows into the indoor heat exchanger 8. The gas-side stop valve 5 is a valve manually opened and closed (by using a tool in some cases). The gas-side stop valve 5 is opened mainly when the outdoor unit 50 is connected to the indoor unit 100 at the time of installation. The gas-side stop valve 5 plays a role of preventing a foreign matter from the outside from entering the outdoor unit 50 at the time of installation. The gas-side filter 6 plays a role of removing a foreign matter from the outside at the time of installation. The gas-side filter 6 is provided for protecting the outdoor unit 50.

The gas refrigerant gives heat to the indoor heat exchanger 8 and thereby liquefies itself into a liquid refrigerant Subsequently, the liquid refrigerant flows via the liquid-side filter 9, the liquid-side stop valve 10, and the first check valve 11 in this order into the receiver 17. The liquid-side stop valve 10 is a valve manually opened and closed (by using a tool in some cases). The liquid-side stop valve 10 is opened mainly when the outdoor unit 50 is connected to the indoor unit 100 at the time of installation. The liquid-side stop valve 10 plays a role of preventing a foreign matter from the outside from entering the outdoor unit 50 at the time of installation. The liquid-side filter 9 plays a role of removing a foreign matter from the outside at the time of installation. The liquid-side filter 9 is provided for protecting the outdoor unit 50.

The receiver 17 plays a role of storing the liquid refrigerant. Subsequently, the liquid refrigerant goes through the bottom of the receiver 17, passes through the subcooling heat exchanger 18, runs through the fourth check valve 14, and flows toward the first and second electronic expansion valves 20, 21.

The pressure of the liquid refrigerant coming out from the bottom of the receiver 17 becomes lower due to a pressure loss through a path than the pressure of the liquid refrigerant on the outflow side of the second check valve 12 and the pressure of the liquid refrigerant on the outflow side of the first and third check valves 11, 13. As a result, basically, the liquid refrigerant going through the bottom of the receiver 17 does not pass through the second check valve 12 and the third check valve 13.

Subsequently, the liquid refrigerant is expanded by the first and second electronic expansion valves 20, 21 and is sprayed and atomized. The opening degrees of the first and second electronic expansion valves 20, 21 are freely controlled by the controller 60. The pressure of the refrigerant is high before passing through the first and second electronic expansion valves 20, 21 and becomes low after passing through the first and second electronic expansion valves 20, 21.

Subsequently, the atomized damp liquid refrigerant exchanges heat with outside air through the first and second outdoor heat exchangers 23, 24 and gasifies due to the heat given from the outside air. In this way, while the refrigerant imparts heat to the indoor heat exchanger 8, heat is imparted from the outdoor heat exchangers 23, 24. Subsequently, the gasified refrigerant passes through the four-way valve 4 and reaches the accumulator 26. The accumulator 26 separates the gaseous refrigerant and the atomized refrigerant and fully gasifies the refrigerant. If the refrigerant remaining in the atomized state returns to the compressors 1, 2, sliding parts of the compressors 1, 2 may be damaged. The accumulator 26 also plays a role of preventing such a situation. Subsequently, the refrigerant gas passing through the accumulator 26 flows into intake ports of the compressors 1, 2.

If the third electronic expansion valve 35 is partially or completely opened under the control of the controller 60, a portion of the liquid refrigerant passing through the subcooling heat exchanger 18 is atomized by the third electronic expansion valve 35 before flowing into the sub-evaporator 27. To the sub-evaporator 27, warm cooling water (cooling water at 60° C. to 90° C.) of the gas engine is introduced.

The atomized liquid refrigerant flowing into the sub-evaporator 27 indirectly exchanges heat with the warm cooling water and becomes a gas before reaching the accumulator 26. In this way, the performance of giving and receiving heat is improved. It is noted the when the heating operation is performed, the fourth electronic expansion valve 36 is controlled to be fully closed.

On the other hand, in the cooling operation, the controller 60 controls the four-way valve 4 to connect the first port 30 and the third port 32 of the four-way valve 4 and connect the second port 31 and the fourth port 33. A flow of heat in the case of cooling will hereinafter simply be described.

In the case of the cooling operation, the gas refrigerant discharged from the first and second compressors 1, 2 passes through the oil separator 3, then passes through the four-way valve 4, and reaches the first and second outdoor heat exchangers 23, 24. In this case, since the temperature of the refrigerant is high, the refrigerant is cooled even with an intensely hot summer air (air at 30 to 40 degrees C.) by the first and second outdoor heat exchangers 23, 24. The gas refrigerant is deprived of heat by the first and second outdoor heat exchangers 23, 24, turning into a liquid refrigerant.

During the cooling operation, the controller 60 controls the opening degrees of the first and second electronic expansion valves 20, 21 to an appropriate opening degree and controls the electromagnetic valve 38 to be fully opened. The liquid refrigerant passing through the first and second outdoor heat exchangers 23, 24 basically passes through the electromagnetic valve 38 and the check valve 39 and reaches the receiver 17. Subsequently, the liquid refrigerant goes through the bottom of the receiver 17, passes through the subcooling heat exchanger 18, and flows from between the second check valve 12 and the first check valve 11 toward the liquid-side stop valve 10.

Subsequently, the liquid refrigerant flows via the liquid-side stop valve 10 and the liquid-side filter 9 into the indoor heat exchanger 8. The low temperature liquid refrigerant flowing into the indoor heat exchanger 8 draws heat from the indoor heat exchanger 8 to cool a room air while gasifying due to the heat given from the indoor heat exchanger 8. In this way, the refrigerant draws heat from the indoor heat exchanger 8 while releasing heat to the first and second outdoor heat exchangers 23, 24. Subsequently, the gasified gas refrigerant passes through the gas-side filter 6, the gas-side stop valve 5, the four-way valve 4, and the accumulator 26 in this order and flows into the intake ports of the compressors 1, 2.

When the controller 60 receives a signal from a remote control operation by a user via a controller (not shown) and a signal line (not shown) of the indoor unit 100 in hot summer season etc., the controller 60 controls the opening degree of the fourth electronic expansion valve 36 to an appropriate opening degree. As a result, a portion of the liquid refrigerant passing through the receiver 17 and the subcooling heat exchanger 18 is cooled by passing through the fourth electronic expansion valve 36 and flows into the subcooling heat exchanger 18. In this way, heat is exchanged between the liquid refrigerant flowing from the receiver 17 into the subcooling heat exchanger 18 without passing through the fourth electronic expansion valve 36 and the liquid refrigerant passing through the fourth electronic expansion valve 36 and flowing into the subcooling heat exchanger 18. As a result, while the liquid refrigerant sent to the indoor heat exchanger 8 is further cooled, the liquid refrigerant passing through the fourth electronic expansion valve 36 is warmed and gasified before being allowed to flow toward the compressors 1, 2.

Figure 2:
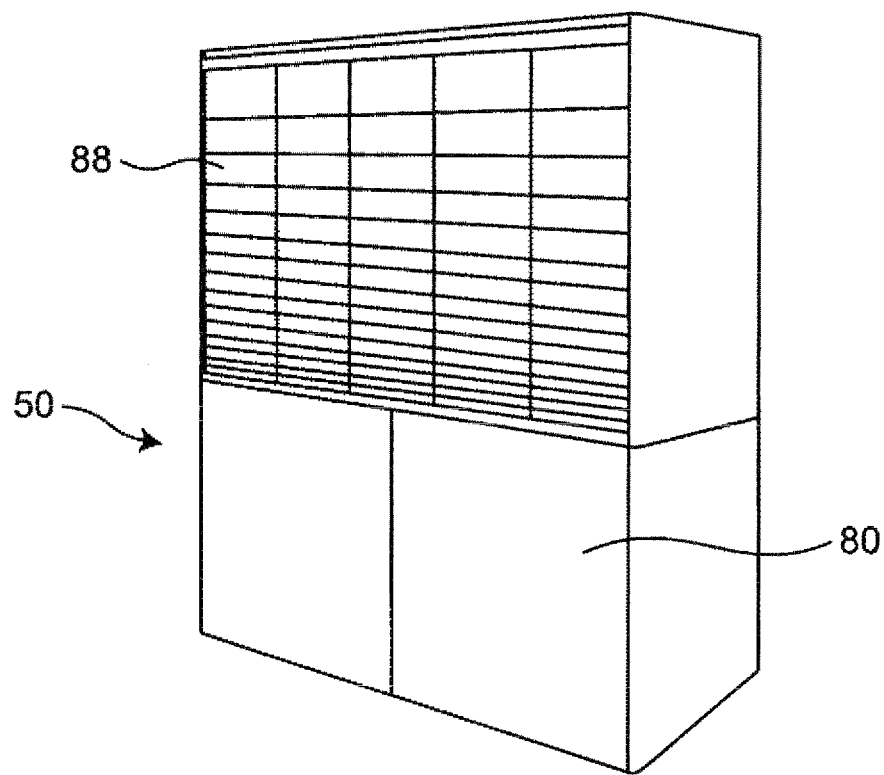
FIG. 2 is a schematic of a package of an outdoor unit.
Figure 3:
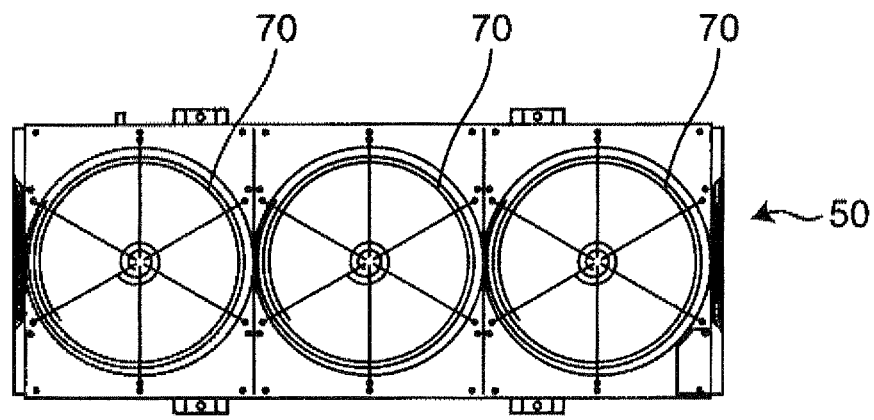
FIG. 3 is a view of the outdoor unit viewed from an upper portion.

FIG. 2 is a schematic of the package 80 of the outdoor unit 50. FIG. 3 is a view of the outdoor unit 50 viewed from an upper portion.

Referring to FIG. 2, in the inside of the package 80, the first and second outdoor heat exchangers 23, 24 (see FIG. 1) are arranged in the upper half, and almost all the other parts (the compressors 1, 2 (see FIG. 1) etc.) are arranged in the lower half. Referring to FIG. 2, in the inside of the package 80, control components are mainly arranged on the near side of the plane of FIG. 2, while various valves etc. are mainly disposed on the far side. On a side surface on the far side not visible in FIG. 2, the package 80 has a connection port for sending the refrigerant to the indoor unit 100 and a connection port for receiving the refrigerant from the indoor unit 100. Referring to FIG. 2, a side surface 88 of the upper portion of the package 80 has a structure allowing passage of air. The package 80 is configured as a case with a plurality of outer plates, for example.

As shown in FIG. 3, the outdoor unit 50 has a plurality of fans 70 arranged in the upper portion of the package 80. A top surface of the outdoor unit 50 has a structure allowing passage of air. By driving the fans 70 to suck air from the side surface 88 of the upper portion of the package 80 and discharge the air from the upper portion of the outdoor unit 50, heat is exchanged between the sucked air and the refrigerant.

Figure 4:
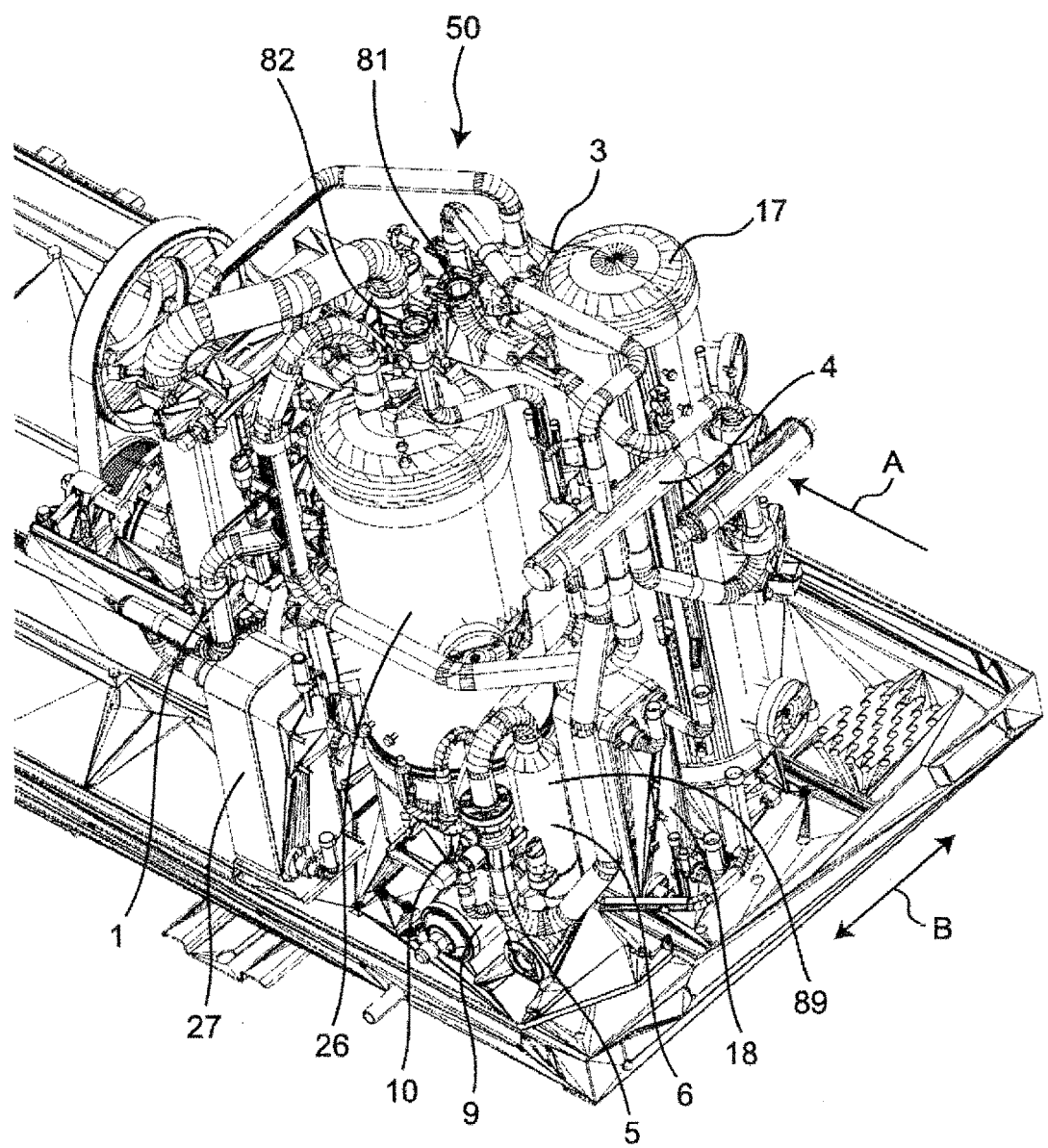
FIG. 4 is a perspective view of the outdoor unit with the package removed and is a perspective view of a portion of an internal structure of the outdoor unit.

FIG. 4 is a perspective view of the outdoor unit 50 with the package 80 removed and is a perspective view of a portion of an internal structure of the outdoor unit 50.

In this perspective view, the oil separator 3, the receiver 17, and the four-way valve 4 are located on the far side of the plane of FIG. 4, while the sub-evaporator 27, the accumulator 26, the one compressor 1 of the two compressors, the liquid-side stop valve 10, the liquid-side filter 9, the gas-side stop valve 5, and the gas-side filter 6 are located on the near side of the plane of FIG. 4.

In FIG. 4, reference numeral 81 denotes an oval flange (oval flange) for connecting the line from the four-way valve 4 to the outdoor heat exchangers 1, 2 (not shown in FIG. 4) disposed on a second floor, and reference numeral 82 denotes an oval flange for connecting the lines from the outdoor heat exchangers 1, 2 to the receiver 17 side. The gas engine (not shown) is disposed on one side in the width direction of the outdoor unit 50 indicated by an arrow A of FIG. 4 relative to the accumulator 26. In other words, the width direction of the outdoor unit 50 is defined as the direction in which the power source of the outdoor unit 50 such as the gas engine is disposed adjacent to the outdoor unit 50.

Figure 5:
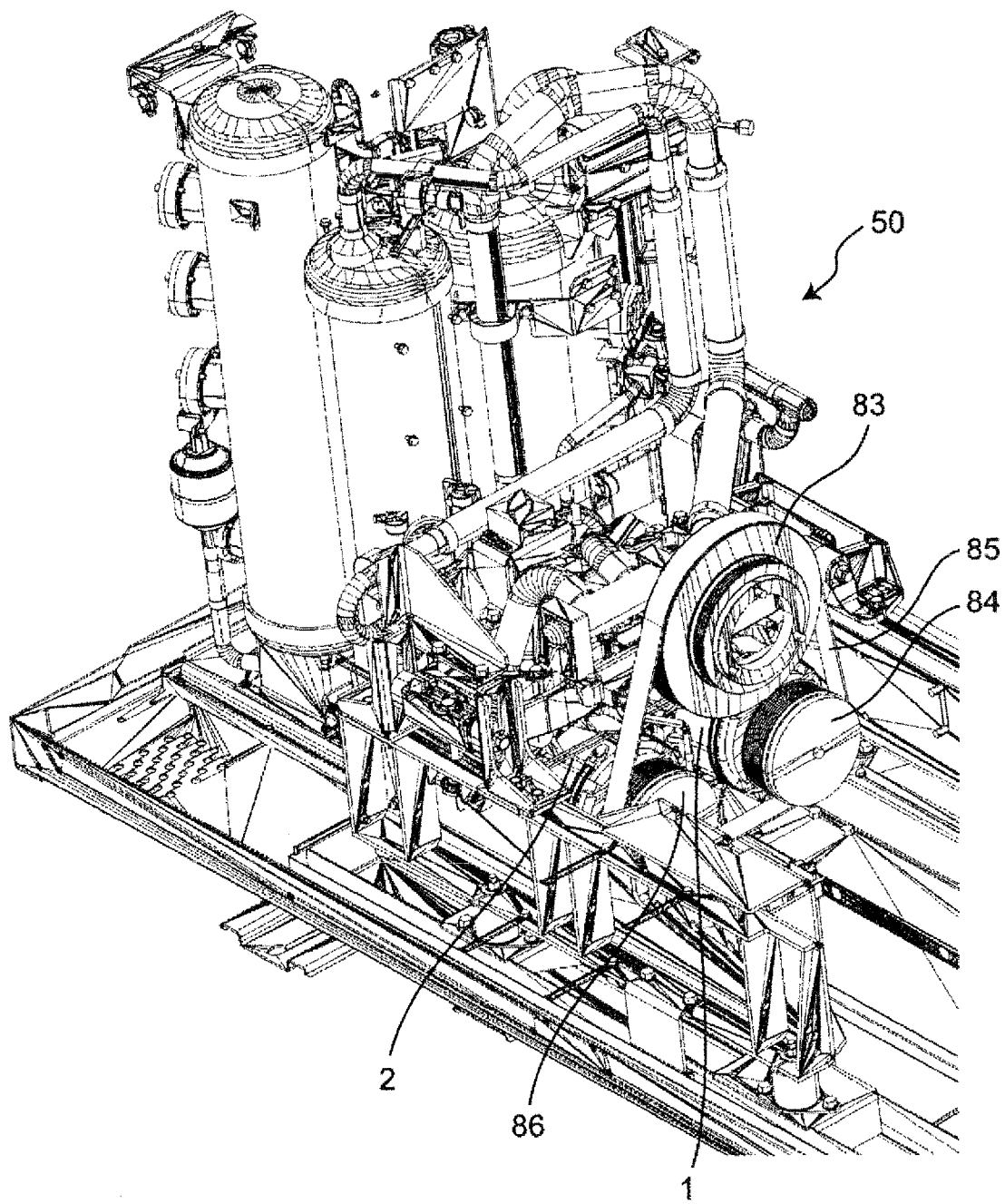
FIG. 5 is a perspective view of a portion of the outdoor unit with the package removed when viewed from a gas engine mounting side.

FIG. 5 is a perspective view of a portion of the outdoor unit 50 with the package 80 removed when viewed from a gas engine mounting side.

In FIG. 5, reference numeral 83 denotes a flywheel of the gas engine; reference numeral 84 denotes an electromagnetic clutch connecting and discontenting a power to the first compressor 1; reference numeral 85 denotes a winding belt; and reference numeral 86 denotes an electromagnetic clutch connecting and discontenting a power to the second compressor 2. As shown in FIG. 5, the winding belt 85 is wound around the flywheel 83, the electromagnetic clutch 84, and the electromagnetic clutch 86. The rotating power of the gas engine is transmitted through the flywheel 83 and the winding belt 85 to the electromagnetic clutches 84, 86 and the rotating power is transmitted from the electromagnetic clutches 84, 86 to the compressors 1, 2.

Referring to FIG. 4 again, the gas-side stop valve 5 extends in the up-down direction. Specifically, the refrigerant passing through the gas-side stop valve 5 flows in the up-down direction. To be exact, the refrigerant passing through the gas-side stop valve 5 flows in the height direction. The central axis of the path allowing passage of the refrigerant of the gas-side stop valve 5 extends in the height direction.

As shown in FIG. 4, the gas-side filter 6 also extends in the up-down direction. Specifically, the refrigerant passing through the gas-side filter 6 flows in the up-down direction. To be exact, the refrigerant passing through the gas-side filter 6 flows in the height direction. The central axis of the path allowing passage of the refrigerant of the gas-side filter 6 extends in the height direction. The gas-side filter 6 has a cylindrical outer circumferential surface 89, and the central axis of the cylindrical outer circumferential surface 89 extends in the height direction.

Figure 6:
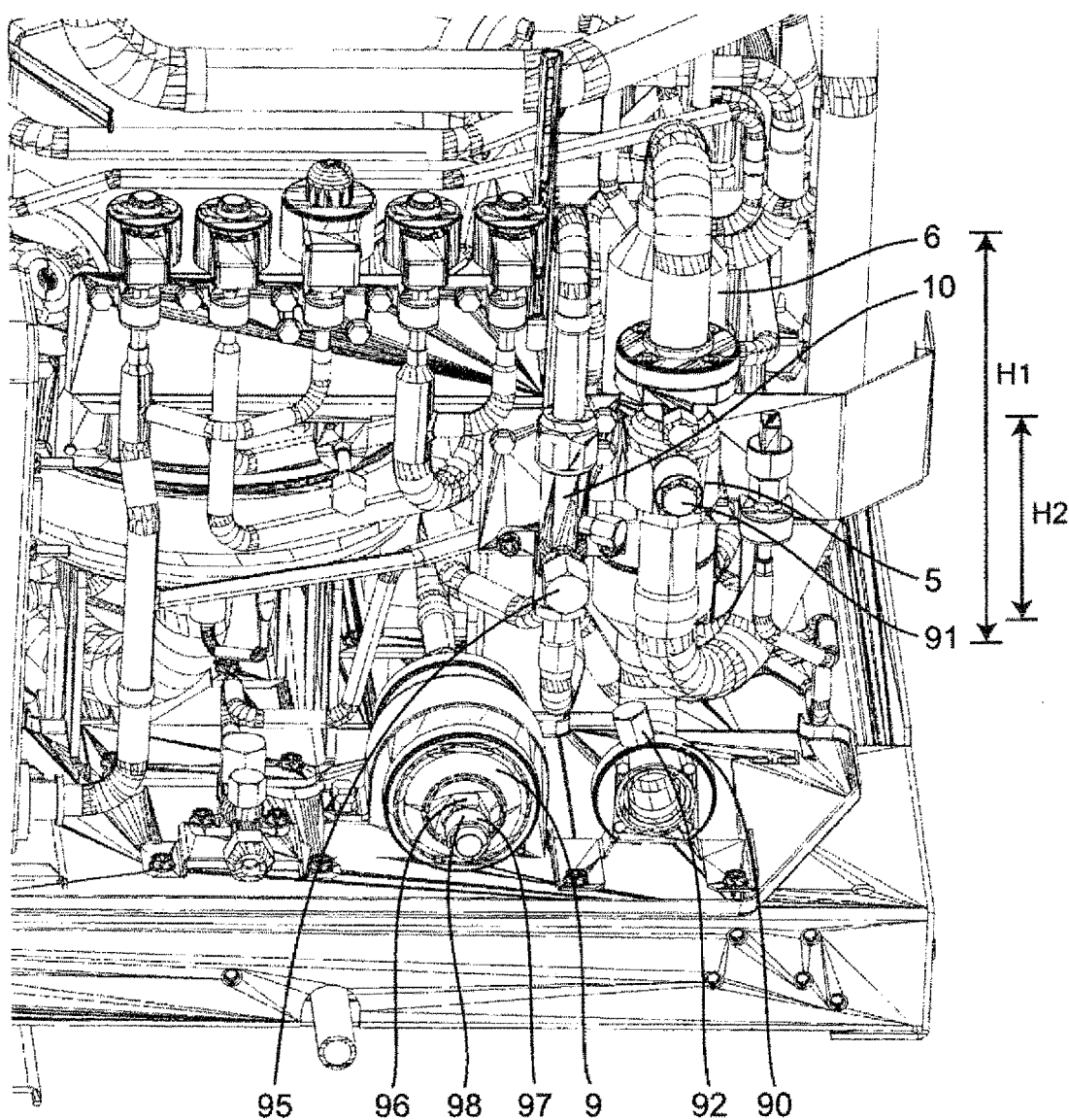
FIG. 6 is an enlarged perspective view of a periphery of a liquid-side filter in the outdoor unit with the package removed.

FIG. 6 is an enlarged perspective view of a periphery of the liquid-side filter 9 in the outdoor unit 50 with the package 80 removed.

In FIG. 6, H1 denotes the presence range of the gas-side filter 6 in the height direction and H2 denotes the presence range of the gas-side stop valve 5 in the height direction. As shown in FIG. 6, the length of the presence range of the gas-side filter 6 in the height direction is longer than the length of the presence range of the gas-side stop valve 5 in the height direction. The gas-side stop valve 5 has a portion overlapping with the gas-side filter 6 in the horizontal direction. The presence range of the gas-side stop valve 5 in the height direction is entirely included in the presence range of the gas-side filter 6 in the height direction. The gas-side stop valve 5 has a portion overlapping with the gas-side filter 6 in the depth direction indicated by an arrow B in FIG. 4.

As shown in FIG. 6, this heat pump has a flange 90 as an example of a gas refrigerant connecting member, and this flange 90 is provided for connection to piping (not shown) on the side of the indoor unit (not shown). The flange 90 is present on the indoor unit side relative to the gas-side filter 6. The flange 90 is provided at a position at which the gas refrigerant pipe 110 (see FIG. 1) is connectable from the outside of the package 80 (see FIGS. 1 and 2). The package 80 is provided with a hole for connecting the gas refrigerant pipe 110. By using the hole, the gas refrigerant pipe 110 is connected to the flange 90. As shown in FIGS. 4 and 6, the gas-side stop valve 5 is provided at a position closer than the gas-side filter 6 to the flange 90.

In FIG. 6, reference numeral 91 denotes a pressure extraction port provided on the gas-side stop valve 5, and reference numeral 92 denotes a pressure extraction port provided on an upper portion of the flange 90. The pressure extraction port 91 and the pressure extraction port 92 each constitute a pressure detecting part. This heat pump has the pressure extraction port 91 provided on the gas stop valve 5 and the pressure extraction port 92 provided on the flange 90 serving as the gas refrigerant connecting member.

Referring to FIG. 4 again, the liquid-side stop valve 10 extends in the up-down direction. Specifically, the refrigerant passing through the liquid-side stop valve 10 flows in the height direction. To be exact, the refrigerant passing through the liquid-side stop valve 10 flows in the height direction. The central axis of the path allowing passage of the refrigerant of the liquid-side stop valve 10 extends in the height direction.

On the other hand, as shown in FIG. 4, the liquid-side filter 9 extends in the horizontal direction. The liquid-side filter 9 extends in a direction substantially parallel to the depth direction. Referring to FIG. 6, this heat pump has a flare connection member 97 as a liquid refrigerant connecting member. The flare connection member 97 is located on the indoor unit side (denoted by 100 in FIG. 1) relative to the liquid-side filter 9. The flare connection member 97 is provided at a position at which the liquid refrigerant pipe 120 (see FIG. 1) is connectable from the outside of the package 80 (see FIGS. 1 and 2). The package 80 is provided with a hole for connecting the liquid refrigerant tube 120. By using the hole, the liquid refrigerant tube 120 is connected to the flare connection member 97.

In FIG. 6, reference numeral 95 denotes a pressure extraction port provided on the liquid-side stop valve 10, and reference numeral 96 denotes a pressure extraction port located closer than an external thread part 98 to the liquid-side stop valve 10 on the flare connecting member 97. The pressure takeout port 95 and the pressure takeout port 96 each constitute a pressure detecting part. The pressure extraction port 96 of the flare connection member 97 is located on an upper portion of the flare connection member 97, and a pressure gauge (not shown) is attached to this pressure extraction port 96. This heat pump has the pressure extraction port 95 provided on the liquid-side stop valve 10 and the pressure extraction port 96 provided on the flare connection member 97 serving as the liquid refrigerant connection member.

According to the embodiment, unlike the conventional technique in which the gas-side filter on the gas refrigerant side and the liquid-side filter on the liquid refrigerant side are mounted outside the package of the outdoor unit, the gas-side filter 6 on the gas refrigerant side and the liquid-side filter 9 on the liquid refrigerant side are provided in the package 80 of the outdoor unit 50 and, therefore, it is not necessary to ensure the place for mounting the gas-side filter 6 and the liquid-side filter 9 on the outside around the package 80 at the time of installation on site. Thus, the workability is improved.

According to the embodiment, the gas-side stop valve 5 and the gas-side filter 6 each extend in the height direction and the gas-side stop valve 5 is present in a height range overlapping with a height range in which the gas-side filter 9 is present. Therefore, the height direction can effectively be utilized to house the gas-side stop valve 5 and the gas-side filter 6 in the package 80. Thus, the gas-side filter 6 can be built into the package 80 and an increase in installation area of the package 80 can be suppressed. The gas-side filter 6 has a length longer than the liquid-side filter 9 and, therefore, if the gas-side filter 6 is disposed in the horizontal direction, the installation area of the package may become larger.

According to the embodiment, since the pressure extraction ports 91, 92 are respectively provided on the gas stop valve 5 and the flange 90 serving as the gas refrigerant connecting member, pressure gauges can be disposed on the upstream side and the downstream side of the gas refrigerant in the gas-side filter 6. Therefore, since the pressure of gas can be measured on the upstream side and the downstream side of the gas-side filter 6, the workability is improved at the time of confirmation of clogging of the gas-side filter 6.

According to the embodiment, the liquid-side stop valve 10 extends in the height direction, and the liquid-side filter 9 extends in the horizontal direction. Therefore, since the extending direction of the liquid-side stop valve 5 is greatly different from the extending direction of the liquid-side filter 9, the liquid-side stop valve 10 and the liquid-side filter 9 can be disposed substantially independently of each other. Thus, since the liquid-side stop valve 10 and the liquid-side filter 9 can be disposed in narrow spaces different from each other, the liquid-side stop valve 10 and the liquid-side filter 9 can each be disposed by effectively utilizing a narrow space (gap).

According to the embodiment, since the pressure extraction ports 95, 96 are respectively provided on the liquid-side stop valve 10 and the flare connection member 97 serving as the liquid refrigerant connecting member, pressure gauges can be disposed on the upstream side and the downstream side of a liquid refrigerant flow in the liquid-side filter 9. Therefore, since the pressure of liquid refrigerant can be measured on the upstream side and the downstream side of the liquid-side filter 9, the workability is improved at the time of confirmation of clogging of the liquid-side filter 9. Additionally, the differential pressure detection of the gas-side filter 6 and the differential pressure detection of the liquid-side filter 9 can be performed by simply removing an outer plate of the same package.

In the embodiment, the heat pump has the one outdoor unit 50 and the one indoor unit 100; however, in the present invention, the heat pump may have any number of one or more outdoor units and may have any number of one or more indoor units.

In the embodiment, as shown in FIG. 4, the gas-side stop valve 5, the gas-side filter 6, and the liquid-side stop valve 10 all extend in the height direction. However, in the present invention, at least one of the gas-side stop valve, the gas-side filter, and the liquid-side stop valve may extend in the extending direction having the component in the height direction larger than the component in the horizontal direction and may extend in a direction inclined in the vertical direction. At least one of the gas-side stop valve, the gas-side filter, and the liquid-side stop valve may extend in the horizontal direction.

In the embodiment, as shown in FIG. 4, the presence range of the gas-side stop valve 5 in the height direction entirely overlaps with the presence range of the gas-side filter 6 in the height direction; however, in the present invention, the presence range of the gas-side stop valve in the height direction may only partially overlap with the presence range of the gas-side filter in the height direction. In the present invention, the presence range of the gas-side stop valve in the height direction may not overlap at all with the presence range of the gas-side filter in the height direction.

In the embodiment, as shown in FIG. 4, the gas-side stop valve 5 has a portion overlapping with the gas-side filter 6 in the depth direction; however; in the present invention, the gas-side stop valve may not overlap with the gas-side filter in the depth direction.

In the embodiment, as shown in FIG. 4, the liquid-side filter 9 extends in the horizontal direction and in the depth direction. However, in the present invention, the liquid-side filter may extend in the horizontal direction and in a direction inclined in the depth direction, or may extend in the horizontal direction and in the width direction. In the present invention, the liquid-side filter may extend in the height direction and may extend in a direction having a height direction component and a horizontal direction component.

In the embodiment, the gas-side stop valve 5 is provided in a portion closer than the gas-side filter 6 to the flange 90 serving as the gas refrigerant pipe connecting member. However, in the present invention, the gas-side stop valve may be provided at a position farther than the gas-side filter from the gas refrigerant pipe connecting member.

In the embodiment, the pressure extraction ports 91, 92 are provided on both the upstream side and the downstream side of gas refrigerant of the gas-side filter 6. However, in the present invention, a pressure extraction port on one or both of the upstream and downstream sides of gas refrigerant of the gas-side filter may be used as a pressure sensor mounting part.

In the embodiment, the pressure extraction ports 95, 96 are provided on both the upstream side and the downstream side of liquid refrigerant of the liquid-side filter 9. However, in the present invention, a pressure extracting port on one or both of the upstream and downstream sides of liquid refrigerant of the liquid-side filter may be used as a pressure sensor mounting part.

In the embodiment, the outdoor heat exchangers 23, 24 suck air from the side surface and discharge the air from the upper portion; however, in the present invention, the outdoor heat exchanger may suck air from any portion and may discharge the air from any portion.

In the embodiment, the gas refrigerant connecting member is the flange 90, and the liquid refrigerant connecting member is the flare connection member 97. However, in the present invention, the gas refrigerant connecting member may be a flare connection member for performing flare connection or may be a member serving as a piping joint such as an elbow, a bend, a reducer, a tee, a cross, a socket, a coupling, a cap, a plug, and a union. In the present invention, the liquid refrigerant connecting member may be a flange or may be a member serving as a piping joint such as an elbow, a bend, a reducer, a tee, a cross, a socket, a coupling, a cap, a plug, and a union.

In the embodiment, the heat pump is a gas-engine-driven heat pump; however, the heat pump of the present invention may be a heat pump driven by an engine other than a gas engine, such as a diesel engine and a gasoline engine. The heat pump of the present invention may be an electrically-driven heat pump.

In the present invention, in comparison with the embodiment, one or more electrical components and parts can appropriately be omitted from the electrical components and parts constituting the embodiment. On the contrary, in the present invention, in comparison with the embodiment, a further electrical component or part can be added to the electrical components and parts constituting the embodiment.

In the present invention, a compressor power source such as an engine and an electric motor may be separated from a compressor by a sill so as to prevent the hot heat of the compressor power source from going to the refrigerant side, or a compressor power source such as an engine and an electric motor may not be separated from a compressor by a sill. Additionally, a new embodiment can obviously be constructed by combining two or more constituent elements out of all the constituent elements described in the embodiment and modification examples.

Although the present invention has been sufficiently described in terms of the preferable embodiment with reference to the accompanying drawings, various variations and modifications are apparent to those skilled in the art. It should be understood that such variations and modifications are included in the present invention without departing from the scope of the present invention according to appended claims.

The disclosures of description, drawings, and claims of Japanese Patent Application No. 2014-237141 filed on Nov. 21, 2014 are incorporated herein by reference in their entirety,

EXPLANATIONS OF REFERENCE OR NUMBERS 1 first compressor
2 second compressor 3 oil separator
4 four-way valve
6 gas-side filter
8 indoor heat exchanger
9 liquid-side filter
10 liquid-side stop valve
17 receiver
18 subcooling heat exchanger
20 first electronic expansion valve
21 second electronic expansion valve
23 first outdoor heat exchanger
24 second outdoor heat exchanger
26 accumulator
27 sub-evaporator
35 third electronic expansion valve
36 fourth electronic expansion valve
38 electromagnetic valve
50 outdoor unit
60 controller
80 package
82 flywheel
90 flange
91, 92, 95, 96 pressure extraction port
100 indoor unit
110 gas refrigerant pipe
120 liquid refrigerant pipe

The invention claimed is:

1. An outdoor unit of a heat pump, the outdoor unit comprising:
a package that includes:
a compressor;
a first heat exchanger in fluid communication with the compressor;
a gas stop valve coupled to the compressor and comprising a gas stop valve inlet and a gas stop valve outlet;
a liquid stop valve;
a gas filter comprising a gas filter inlet and a gas filter outlet, wherein:
the gas filter inlet is disposed above the gas filter and coupled to the gas stop valve outlet; and
at least a portion of the gas stop valve is present in a height range overlapping with a height range in which the gas filter is present; and
a liquid filter coupled to the liquid stop valve and configured to be coupled, via a liquid pipe, to an indoor unit of the heat pump;
wherein:
the gas stop valve and the gas filter define a gas flow path from the gas stop valve inlet, through the gas stop valve to the gas stop valve outlet, to the gas filter inlet;
the gas stop valve extends in a first direction from the gas stop valve inlet to the gas filter outlet and the gas filter extends in a second direction from the gas filter inlet to the gas filter outlet, the second direction being parallel to the first direction; and
the first and second direction each extend in an up-down direction.

2. The outdoor unit according to claim 1, further comprising:
a flange coupled to a housing of the gas filter and configured to be coupled, via a gas pipe, to the indoor unit that comprises an indoor heat exchanger; and
wherein:
the gas stop valve is physically positioned between the gas filter and the flange, and the gas stop valve and the flange are each provided with a pressure extraction port.

3. The outdoor unit according to claim 2, wherein:
the liquid stop valve has a flow path that extends in an up-down direction, and the liquid filter has a flow path that extends in a horizontal direction.

4. The outdoor unit according to claim 3, where:
the liquid stop valve is provided with a pressure extraction port; and
the gas flow path is further defined from the compressor to the gas stop valve inlet, through the gas stop valve, to the gas stop valve outlet, to the gas filter inlet, through the gas filter, to the gas filter outlet, to the flange, and to the indoor unit.

5. The outdoor unit according to claim 1, further comprising:
a flange coupled to the gas filter and configured to be coupled, via a gas pipe, to the indoor unit that comprises an indoor heat exchanger; and
wherein:
the gas stop valve and the flange are each provided with a pressure extraction port.

6. The outdoor unit according to claim 5, wherein the liquid stop valve has a flow path that extends in an up-down direction, and the liquid filter has a flow path that extends in a horizontal direction.

7. The outdoor unit according to claim 6, wherein:
the liquid stop valve is provided with a pressure extraction port; and
the gas flow path is further defined from the outdoor unit through the liquid filter, through the liquid stop valve, to the compressor.

8. The outdoor unit according to claim 1, wherein the gas filter is configured to receive a gas from the gas stop valve.

9. The outdoor unit according to claim 1, wherein the gas filter outlet is coupled to a flange configured to be coupled, via a gas pipe, to the indoor unit.

10. The outdoor unit according to claim 1, wherein the gas stop valve and the gas filter are coupled via a U-shaped connector.

11. The outdoor unit according to claim 10, wherein the gas flow path is further defined from the gas filter inlet, through the gas filter, to the gas filter outlet, to the indoor unit via a gas pipe.

12. An outdoor unit of a heat pump, the outdoor unit comprising:
a package that includes:
a compressor;
a first heat exchanger in fluid communication with the compressor;
a gas stop valve coupled to the compressor, the gas stop valve comprising a gas stop valve inlet and a gas stop valve outlet;
a gas filter coupled to the gas stop valve, the gas filter comprising a gas filter inlet and a gas filter outlet;
a flange coupled to the gas filter and configured to be coupled, via a gas pipe, to an indoor unit, the gas stop valve physically positioned between the gas filter and the flange;
a liquid stop valve; and
a liquid filter coupled to the liquid stop valve and configured to be coupled, via a liquid pipe, to the indoor unit;
wherein:
the gas filter inlet is disposed above the gas filter and coupled to the gas stop valve outlet;

at least a portion of the gas stop valve is present in a height range overlapping with a height range in which the gas filter is present;

the gas stop valve and the gas filter define a gas flow path from the gas stop valve inlet, through the gas stop valve to the gas stop valve outlet, to the gas filter inlet;

the gas stop valve extends in a first direction from the gas stop valve inlet to the gas filter outlet and the gas filter extends in a second direction from the gas filter inlet to the gas filter outlet, the second direction being parallel to the first direction; and the first and second direction each extend in an up-down direction.

13. The outdoor unit of claim 12, wherein the gas stop valve is provided with a first pressure extraction port.

14. A heat pump comprising:

an outdoor unit comprising a package, the package comprising:
- a compressor;
- a first heat exchanger in fluid communication with the compressor;
- a gas stop valve coupled to the compressor, the gas stop valve comprising a gas stop valve inlet and a gas stop valve outlet;
- a gas filter coupled to the gas stop valve, the gas filter comprising a gas filter inlet and a gas filter outlet;
- a flange coupled to the gas filter and configured to be coupled, via a gas pipe, to an indoor unit, the gas stop valve physically positioned between the gas filter and the flange;
- a liquid stop valve; and
- a liquid filter coupled to the liquid stop valve and configured to be coupled, via a liquid pipe, to the indoor unit; and wherein:
- the gas filter inlet is disposed above the gas filter and coupled to the gas stop valve outlet;
- at least a portion of the gas stop valve is present in a height range overlapping with a height range in which the gas filter is present;
- the gas stop valve and the gas filter define a gas flow path from the gas stop valve inlet through the gas stop valve to the gas stop valve outlet to the gas filter inlet;
- the gas stop valve extends in a first direction from the gas stop valve inlet to the gas filter outlet and the gas filter extends in a second direction from the gas filter inlet to the g as filter outlet the second direction being parallel to the first direction; and
- the first and second direction each extend in an up-down direction; and
- the indoor unit comprising a second heat exchanger.

15. The heat pump of claim 14, further comprising the gas pipe coupled to the flange.

16. The heat pump of claim 14, wherein the indoor unit is coupled to the outdoor unit.

17. The heat pump of claim 16, further comprising:
the gas pipe coupled to the indoor unit and the outdoor unit; and
the liquid pipe coupled to the indoor unit and the outdoor unit;
wherein:
the liquid pipe is coupled to the liquid filter; and
the gas pipe is coupled to the flange.

* * * * *